Figure 5:
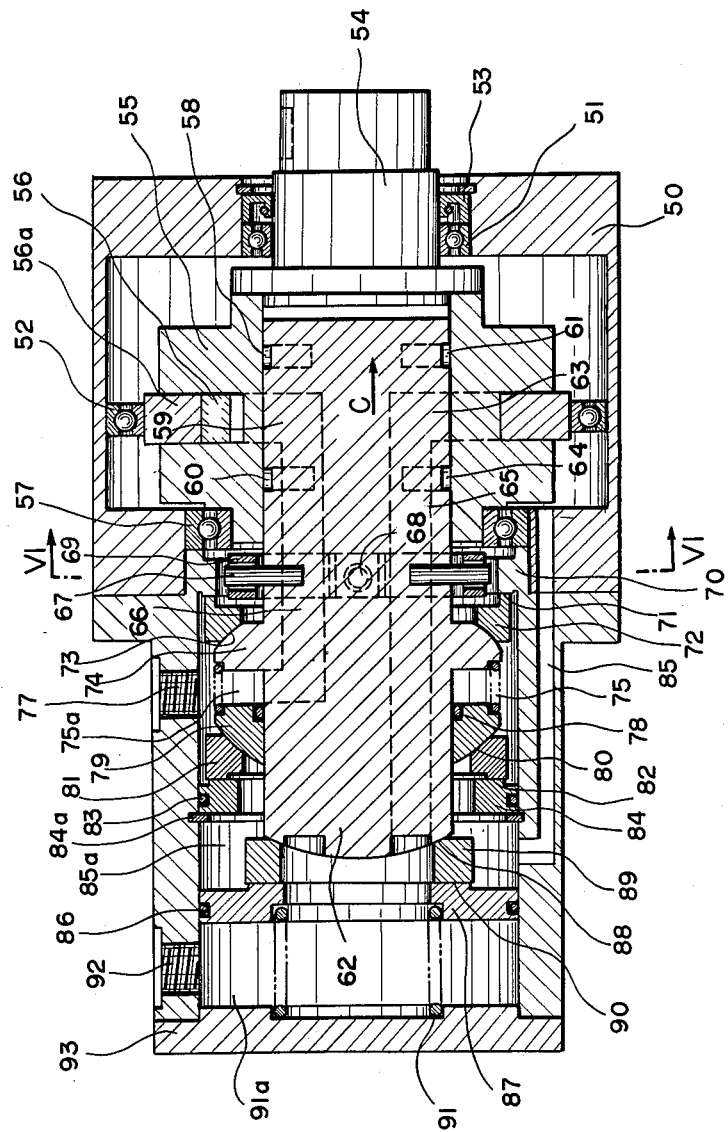

Nov. 6, 1962
K. EICKMANN
3,062,151
SEALING ARRANGEMENT BETWEEN RELATIVELY ROTATING PARTS IN HYDRAULIC
AND PNEUMATIC MACHINES, ESPECIALLY GAS AND LIQUID PUMPS
AND MOTORS, INTERNAL COMBUSTION ENGINES, HYDRAULIC
TORQUE CONVERTERS, AND THE LIKE
Filed Dec. 29, 1958
7 Sheets-Sheet 1
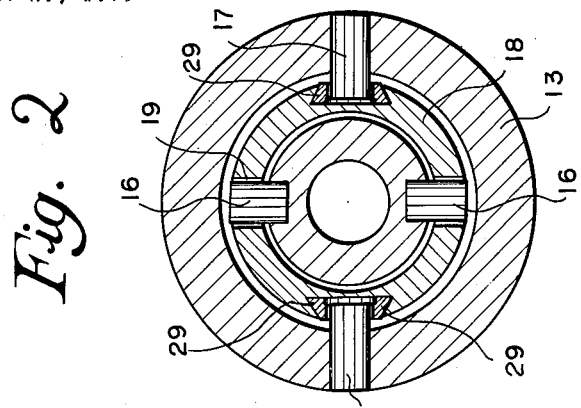
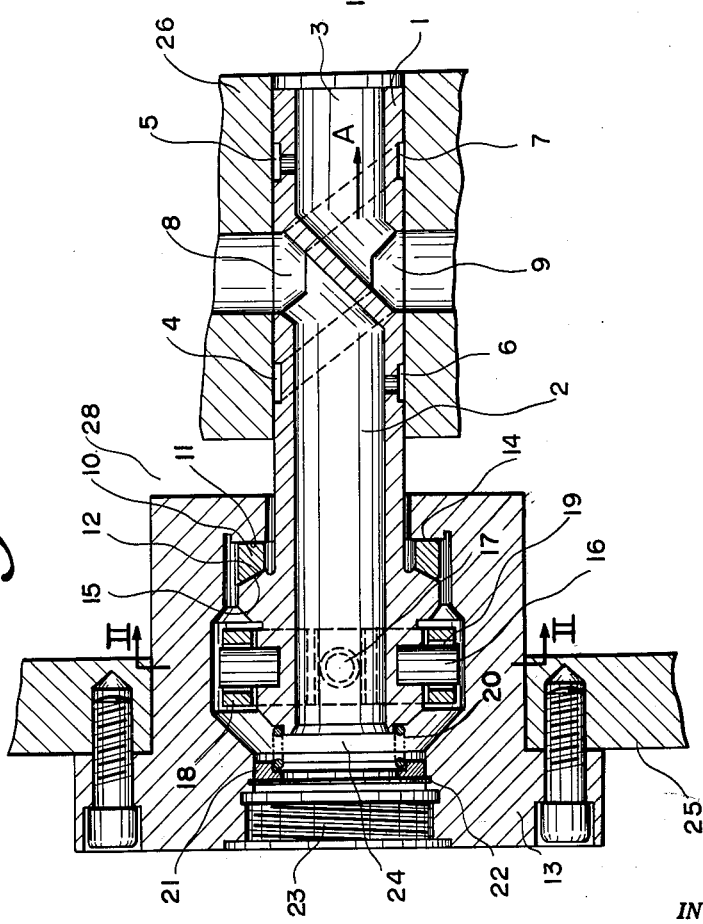
INVENTOR.
KARL EICKMANN
BY

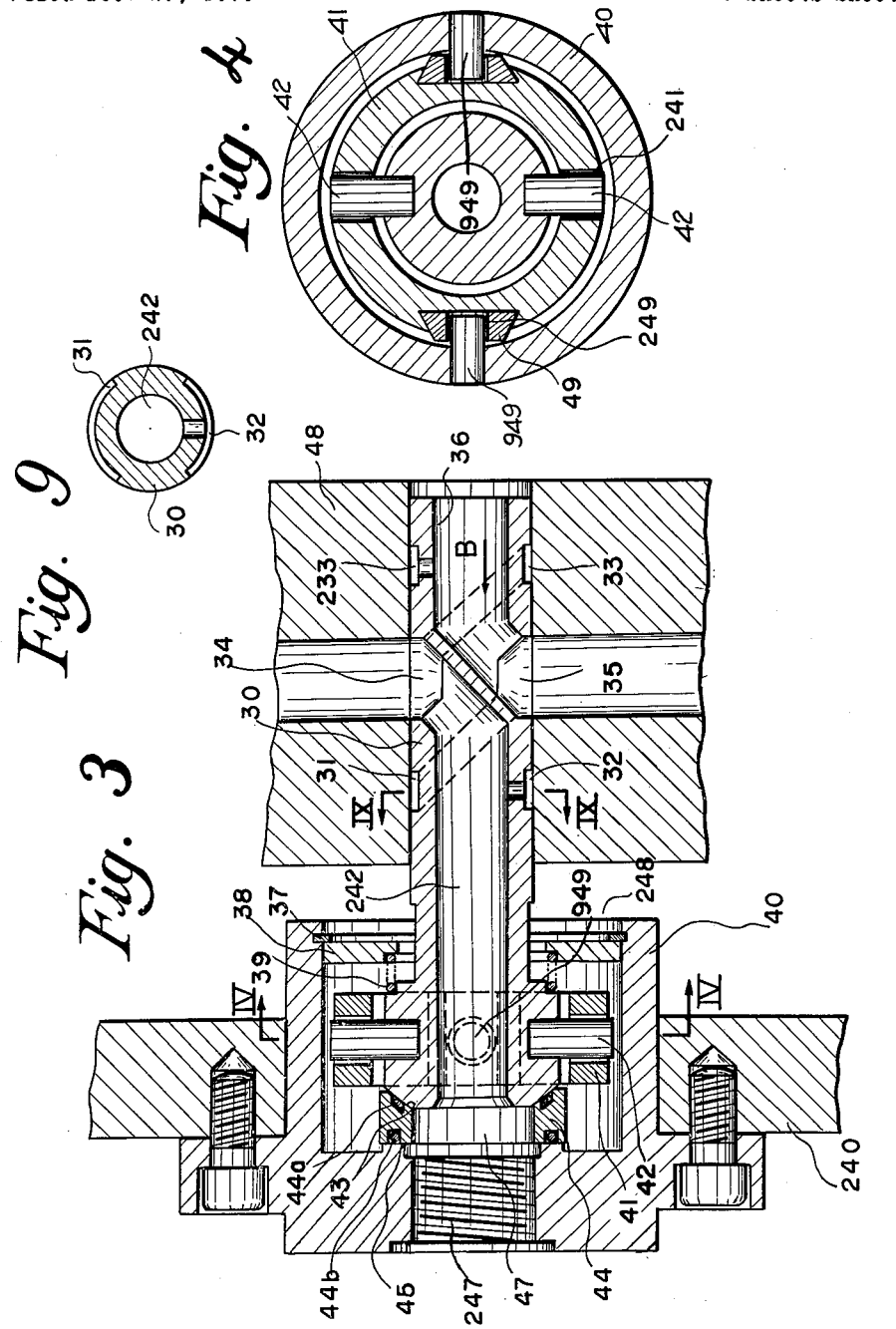

INVENTOR.
KARL EICKMANN

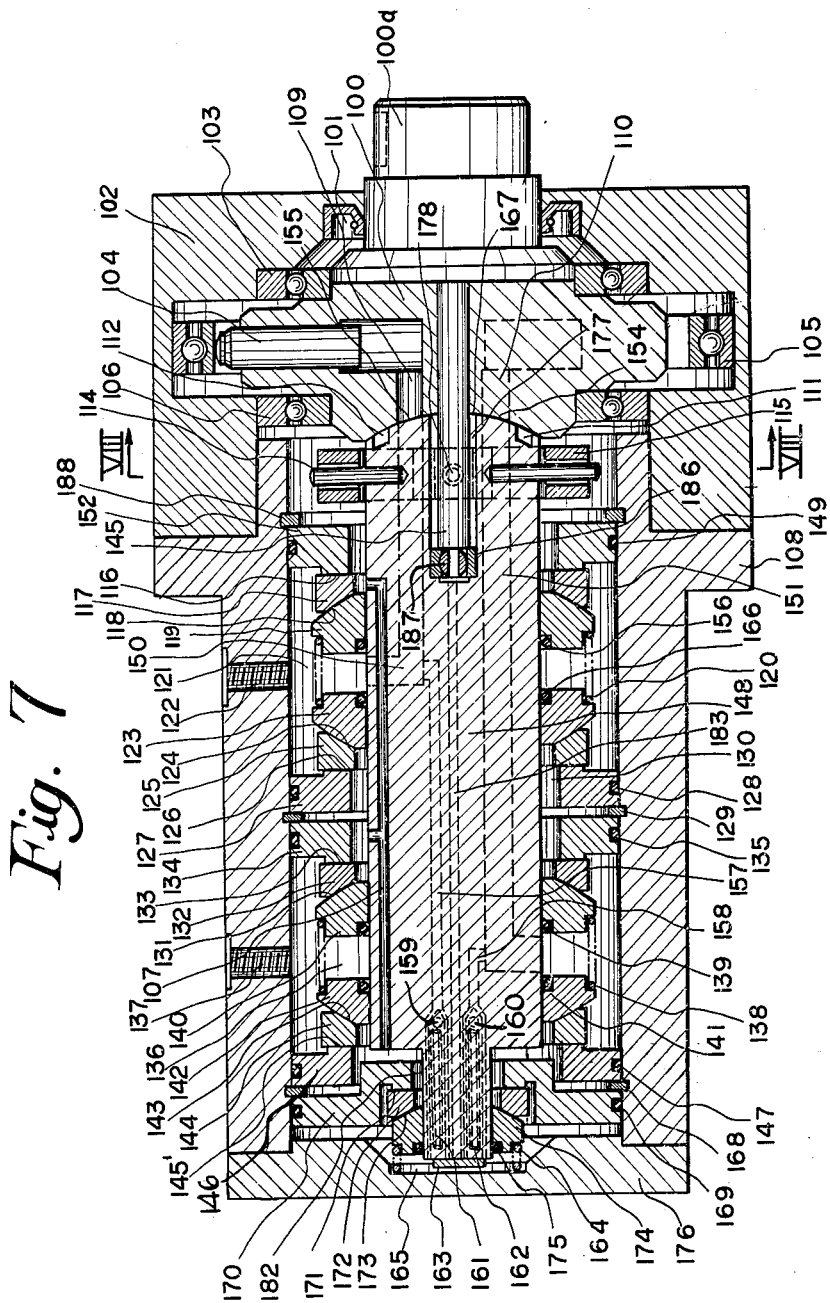

Nov. 6, 1962 K. EICKMANN 3,062,151
SEALING ARRANGEMENT BETWEEN RELATIVELY ROTATING PARTS IN HYDRAULIC
AND PNEUMATIC MACHINES, ESPECIALLY GAS AND LIQUID PUMPS
AND MOTORS, INTERNAL COMBUSTION ENGINES, HYDRAULIC
TORQUE CONVERTERS, AND THE LIKE
Filed Dec. 29, 1958 7 Sheets-Sheet 7

INVENTOR.
KARL EICKMANN
BY
Leon M. Strauss
AGT.

United States Patent Office //

3,062,151
Patented Nov. 6, 1962

3,062,151
SEALING ARRANGEMENT BETWEEN RELATIVELY ROTATING PARTS IN HYDRAULIC AND PNEUMATIC MACHINES, ESPECIALLY GAS AND LIQUID PUMPS AND MOTORS, INTERNAL COMBUSTION ENGINES, HYDRAULIC TORQUE CONVERTERS, AND THE LIKE
Karl Eickmann, 2 Moeglinger Strasse, Markgroeningen, Germany
Filed Dec. 29, 1958, Ser. No. 783,455
Claims priority, application Japan Dec. 31, 1957
14 Claims. (Cl. 103—121)

This invention relates to a sealing arrangement between two relatively movable members for preventing leakage of a fluid under pressure past the sealing arrangement. It is applicable for example to gas or liquid rotary machines, such as pumps, motors, turbines, compressors, internal combustion engines, or hydraulic torque converters.

One simple method of providing a seal between relatively rotating members is to use a resilient packing such as leather, rubber or synthetic materials. For example, the packing may be fixed to one of two cylindrical concentric members which are rotatable relative to one another, a sealing lip of the packing bearing against the member to which the packing is not fixed. In operation, the sealing lip is tightly pressed against the member with which it is in contact by the pressure of fluid in the space between the two members to provide a good seal.

This kind of seal, which for example, has been commonly used as a shaft seal in motor cars, is however, only effective at low fluid pressures and at low rotational speeds. At high fluid pressures or high rotational speeds, permanent damage to the packing may be caused by heat produced by friction. It will be appreciated that the friction losses caused by a seal must not be so high as seriously to impair the overall mechanical efficiency of the apparatus in which it is used.

It is one object of this invention to provide an improved and simple sealing arrangement between relatively movable members, which serves to prevent leakage of fluids under pressure between said members.

According to this invention, there is provided a sealing arrangement for sealing a passage between two relatively movable members against the flow of fluid under pressure therethrough in which at least one sealing member is mounted on one of said members so as to be movable in response to uncentered movements of said members and relative to a complementary sealing member, whereby to maintain a pressure-tight seal.

The present invention is not limited to a sealing arrangement between two members which are relatively rotatable, but is particularly suitable in the case where one of the members is normally stationary and the other member is subject to small lateral or angular displacements relative to the first member. Thus one application of the present invention is a sealing arrangement for a control pintle of a fluid rotary machine.

Since, however, in all pressure generators, pumps, fluid motors or the like, the control rods or pintles will always have axial or radial movements which are decentered, and since all fluid openings in the rotors must be tightly closed, in order to insure proper sealing arrangement, it is of extreme importance that the pintles are permitted to follow the inaccurate movements of the rotating parts while maintaining tight sealing engagement with resilient packing rings or the like. Only if this is possible, without impediments and if there is prevailing a balance or equilibrium of fluid pressure can there be a tight sealing so that there may be proper operation at high pressure safely.

Control pintles are used to control the flow therethrough of fluid under pressure to successive working chambers of a fluid rotary machine, and part of their surfaces comprises a control surface which can be, for example, cylindrical, plane or spherical. The control pintle is stationary and cooperates with the rotor of the machine so that in operation ports in the control surface of the control pintle successively communicate with corresponding ports in the rotor which lead to the working chambers. Leakage of fluid between the control surface of the pintle and the control surface of the rotor must therefore be prevented or reduced. A "floating" control pintle is one which is so arranged that regardless of the fluid pressures present in the various passages thereof, such pressures do not result in a resultant force between the control pintle and the rotor which has a component radially of the rotor.

At present, it is customary to connect a control pintle rigidly to the stationary casing of the machine. Thus should the rotor vibrate or become decentered in any way, e.g. should the rotor become out of balance so that it vibrates while its axis is inclined by a small angle to the normal position of its axis, such decentered movement will produce a resultant force between the control pintle and the rotor, which force has a component radially of the rotor. This force produces localized wear and heating of the control surface of the control pintle and the cooperating surface of the rotor until eventually leakage at the control surface becomes too great and the control pintle and rotor have to be renewed. In extreme cases, this force may cause sticking between the control pintle and the rotor. In order to overcome this difficulty, it is proposed, according to a preferred feature of this invention, to replace the fixed control pintle by a movable one which can follow limited decentered movement of the rotor, and to seal the various entry and exit passages leading to and from the control pintle, in such a way that each seal will be unaffected by decentered movement of the rotor.

Thus, for example, in known rotary vane pumps or rotary vane motors having fixed control pintles, localized wearing and heating occurs when the maximum fluid pressure therein is from 40 to 120 atmospheres. With a movable control pintle which is sealed by a sealing arrangement according to the invention, the maximum fluid pressure can be up to 300 atmospheres, or even greater with suitable designing, without these difficulties arising. Since decentered movement of a rotor of a high pressure fluid rotary machine tends to be greater than with low-pressure machines, it will be appreciated that the present invention is particularly suitable for use therein.

According to a further feature of the invention, there is provided a sealing arrangement for sealing a passage between two relatively movable members comprising a sealing member disposed between said two relatively movable members, the pair of cooperating surfaces between the sealing member and one of said two members being complementary and the pair of cooperating surfaces between the sealing member and the other of said two members also being complementary, the surfaces of each pair being pressed together in operation to seal said passage, one of said pairs of surfaces being spherical while the other pair of surfaces is so formed as to allow limited lateral movement of one of said two members relative to the other while maintaining the sealing of said passage.

If the two relatively movable members and the sealing member are made of metal, there will be metal-to-metal contact between each pair of complementary surfaces.

If desired, both pairs of complementary surfaces could be spherical but preferably only one pair is spherical and the other pair is plane.

Figure 8:
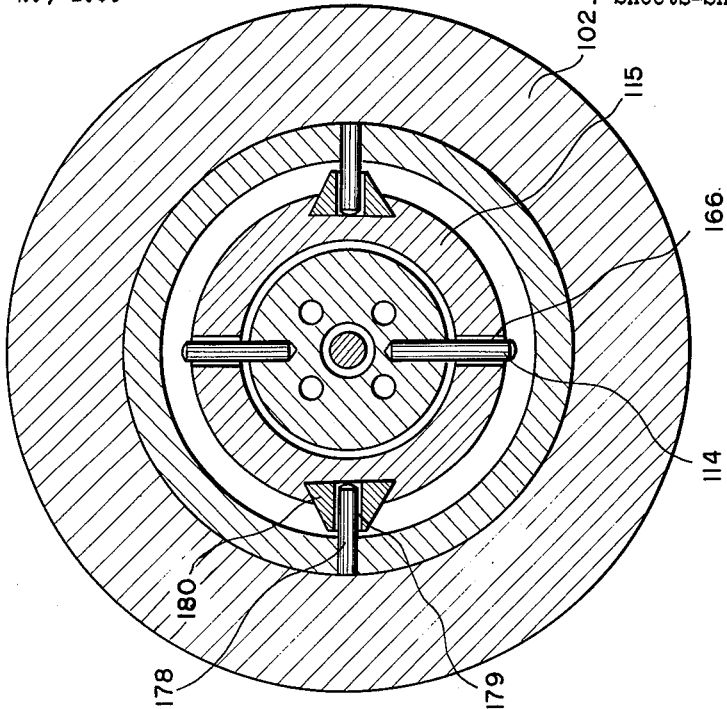
Figure 6:
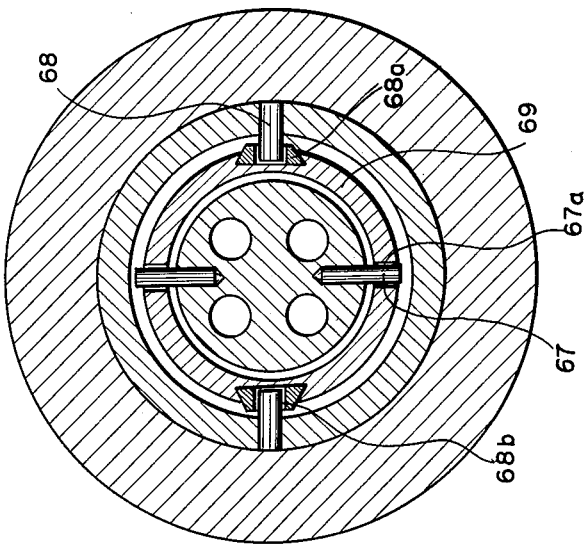
Figure 10:
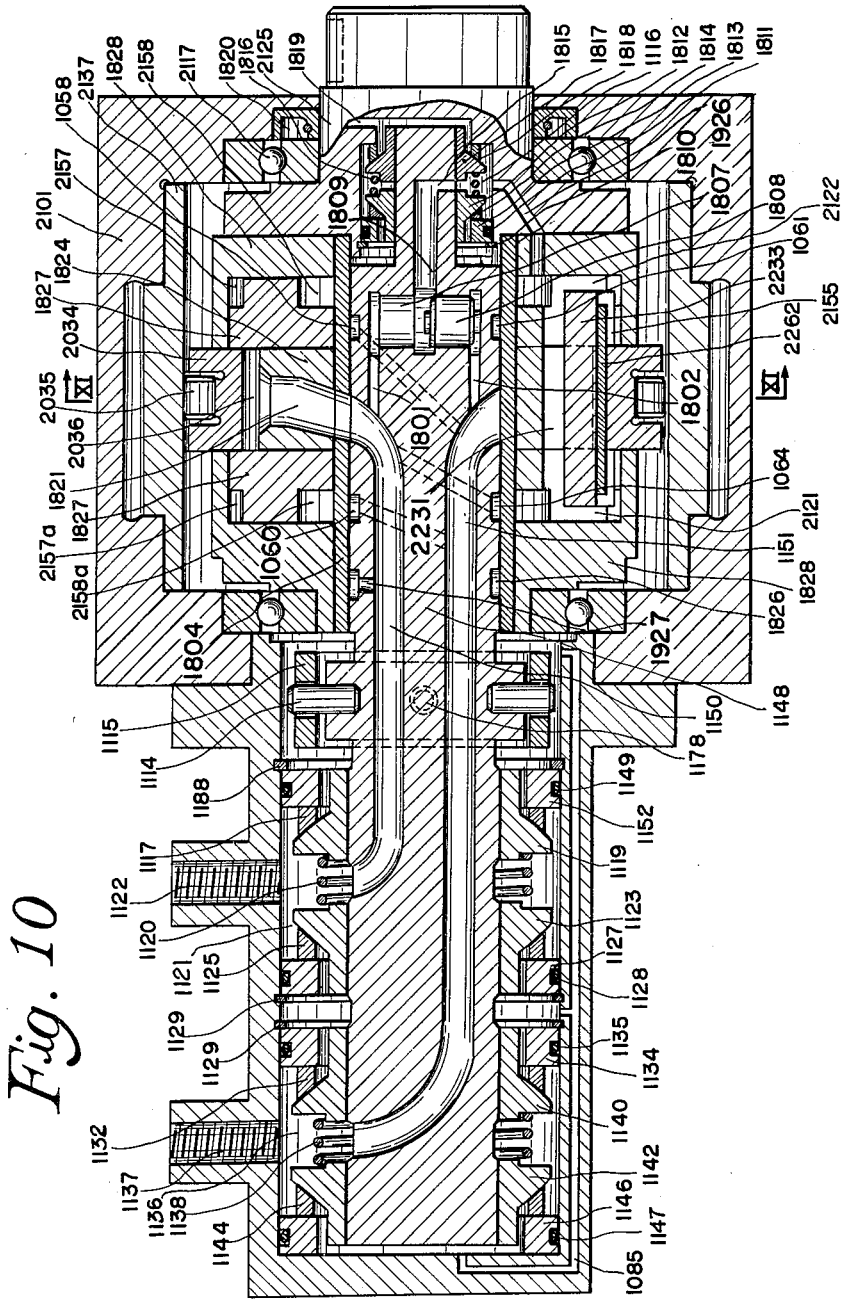
Figure 11:
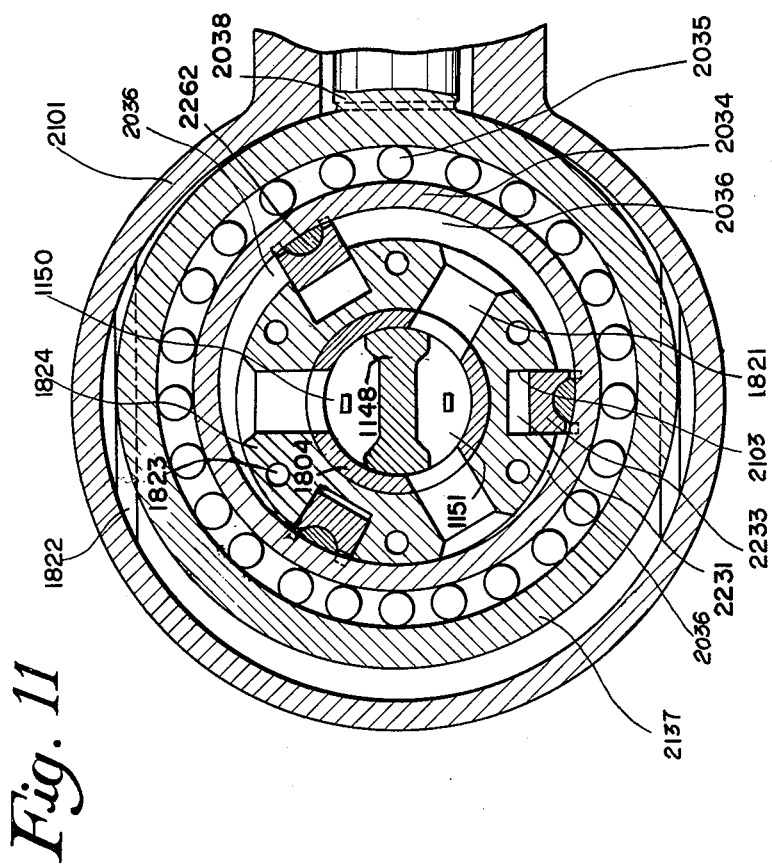

There will now be described by way of example only, some embodiments of the invention with reference to the accompanying drawings in which:

FIGURE 1 shows a longitudinal section of a preferred embodiment of this invention, illustrating a sealing arrangement for a floating control pintle of a rotary fluid motor, for example an oil motor, FIGURE 2 shows a cross-section taken on the line II—II of FIGURE 1, FIGURE 3 is a longitudinal section of a second embodiment of a sealing arrangement for a floating control pintle, FIGURE 4 shows a cross-section taken on the line IV—IV in FIGURE 3, FIGURE 5 shows a longitudinal section of a vane pump, incorporating a sealing arrangement according to a third embodiment of the invention, wherein a control pintle is constructed in a cylindrical shape and provided with supply and discharge passages for the working fluid, FIGURE 6 is a cross-section taken on the line IV—IV in FIGURE 5, FIGURE 7 is a longitudinal section of a multi-piston rotary pump, which is controlled by a control pintle provided with a sealing arrangement according to a fourth embodiment of the invention, wherein the contact surface between control pintle and rotor is spherical, FIGURE 8 is a cross-section taken on the line VIII—VIII in FIGURE 7, FIGURE 9 shows a cross-section of a control pintle shown by way of example and taken on the line IX—IX in FIGURE 3, FIGURE 10 is a longitudinal section of another rotary vane machine incorporating a sealing arrangement according to the invention, and FIGURE 11 is a cross-section taken on the line XI—XI in FIGURE 10.

With reference to FIGS. 1 and 2, a control pintle 1 makes a close fit within a bore of a rotor 26 of an oil motor. The passage 8 in the control pintle 1 communicates with apertures 6, 7 which open on the circumference of the control pintle and which are closed by the rotor 26. The areas of the apertures 6, 7 are such that fluid pressure in the passage 8 gives rise to no resultant radial pressure between the control pintle 1 and the rotor 26. Likewise, the passage 9 communicates with apertures 4, 5 so that fluid pressure in passage 9 gives rise to no resultant radial pressure between the control pintle 1 and the rotor 26. The control pintle 1 is thus a "floating" control pintle, i.e. in operation it is in a "floating" condition with respect to the rotor 26.

At one end, the control pintle 1 extends into a housing 13 which is secured to the motor casing 25. A universal or Cardan joint between the housing 13 and the control pintle 1 for preventing rotation of the control pintle 1 relative to the housing 13 comprises a ring 18 and two pairs of diametrically opposite pins 16 and 17. The pins 16 are secured to the control pintle 1 and extend into holes 19 in the ring 18, and the pins 17 are secured to the housing 13 and extend into slide rails 29 which fit in dovetail grooves in the ring 18 as shown in FIG. 2. The universal joint permits limited axial and radial movement between the control pintle 1 and the housing 13.

The chamber 24 in the housing 13 is sealed from the chamber 28 defined by the motor casing 25, by means of a sealing ring 10 which surrounds the control pintle 1. On one side, the ring 10 has a spherical surface 12 which bears against a complementary surface 15 on the control pintle 1, while on the other side, the ring 10 has a plane surface 11 which bears against a plane surface 14 on the interior of the housing 13.

The sealing surfaces of the control pintle 1, ring 10 and housing 13 are urged together by a spring 20 which is maintained in position by a cap 21 and a spring clip 22. The chamber 24 communicates with the exterior of the motor casing 25 through a screw connection 23.

In operation, oil under pressure flows by way of the screw connection 23, chamber 24, passages 2 and 8 in the control pintle 1 into the rotor 26, from which the oil is discharged into the passage 9 and flows into the motor casing 25 by way of the passage 3. The pressure in the passage 8 is higher than in the passage 9 so that the oil exerts a resultant force on the control pintle in the direction of the arrow A. Furthermore, the oil in the chamber 24 exerts a force on the control pintle 1 also in the direction of the arrow A. These forces supplement the pressure exerted on the control pintle 1 by the spring 20, thereby increasing the surface pressure between the co-operating sealing surfaces on the control pintle 1, the sealing ring 10, and the housing 13, and thus improving the seal between the chambers 24 and 28.

The universal joint comprising the ring 18 and the pairs of pins 16, 17, besides preventing rotation of the control pintle 1, maintains the control pintle 1 to follow limited decentered movement of the rotor 26 in a manner that it is believed will be apparent from the foregoing description, such decentered movement being accompanied by corresponding movement of the sealing ring 10 so that a good seal is maintained. The spring 20 is such that even when the supply pressure of the oil in the chamber 24 is low, the seal is still effective.

Referring to FIGS. 3 and 4, a "floating" control pintle 30 makes a close fit in a rotor 48 of an oil pump. A passage 35 in the control pintle 30 communicates with apertures 31, 233 on the circumference of the control pintle, and a passage 34 communicates with two further apertures 32, 33. The circumferential extent of the apertures 31, 32 is shown in FIG. 9. The apertures 31, 32, 33, 233 serve to prevent the oil pressure in the passages 34, 35 from creating a resultant radial pressure between the control pintle 30 and the rotor 48 in the manner that has been described with reference to FIG. 1, and thus to ensure a "floating" condition of the control pintle with respect to the rotor 48.

At one end, the control pintle 30 extends into a housing 40 which is secured to the pump casing 240. A universal joint between the housing 40 and the control pintle 30 for preventing the rotation of the control pintle relative to the housing 40, comprises a ring 41 and two pairs of diametrically opposite pins 42 and 949. The pins 42 are secured to the control pintle 30 and extend into holes 241 in the ring 41, and the pins 949 are secured to the housing 40 and extend into holes 249 in the slide rails 49 which fit in dovetail grooves in the ring 41 as shown in FIG. 4. The universal joint permits limited movement of the control pintle 30 with respect to the housing 40 in the same manner that has been described with reference to FIGS. 1 and 2.

A chamber 47 which communicates with exterior of the pump through a screw connection 247 is sealed from the chamber 248 defined by the pump casing 240 and thus the interior of the housing 40 by a sealing ring 44. On one side, the ring 44 has a spherical surface which bears against a complementary surface 43 on the control pintle 30, whilst on the other side, the ring 44 has a plane surface which bears against a plane surface 45 on the interior of the housing 40. Two packing rings 44a, 44b, are embedded in grooves in the spherical and plane surfaces of the ring 44 to improve the seal.

The sealing surfaces of the control pintle 30, ring 44 and housing 40 are urged together and the packing rings 44a, 44b are compressed by a spring 39 which is maintained in position by a cap 38 and a spring clip 37.

In operation, oil drawn into the rotor 48 by way of the screw connection 247, chamber 47 and passage 242 and passage 34, and oil under pressure is discharged from the port 36 in the rotor 48 by way of the passage 35 which opens into the housing 40 through an opening in the end of the control pintle 30. The pressure in the passage 35 is higher than in the passage 34 so that the oil exerts a resultant force on the control pintle 30 in the direction of the arrow B. This force supplements the pressure exerted on the control pintle 30 by the spring 39 thereby increasing the surface pressure between the cooperating sealing surfaces on the control pintle 30, the sealing ring 44 and the housing 40, and thus improving the seal between the chambers 47 and 248.

The universal or Cardan joint comprising the ring 41 and the pairs of pins 42 and 949, besides preventing the control pintle 30 from rotating, allows the control pintle to follow limited decentered movement of the rotor 48 in a manner that it is believed will be apparent from the foregoing description.

In FIG. 5 there is shown a longitudinal section of a vane pump or vane motor. Two screw connections 77, 92 are provided on a housing member 70 which serve as the inlet and outlet connections or vice-versa depending on whether the machine is used as a pump or motor.

A "floating" control pintle 62 makes a close fit in the bore of a rotor 55 which is connected to a shaft 54 and is supported in bearings 51, 57. A conventional shaft seal 53 is provided for the shaft 54. The rotor 55 includes a plurality of vanes 56 defining a plurality of cellular chambers whose outer ends are closed by a ring 56a which is rotatable in a bearing 52.

Inside the control pintle 62, there are two passages 65, 66 which communicates with the rotor through circumferential opening 63, 59 respectively. The "floating" condition of the control pintle 62 is ensured by connecting circumferential apertures 61, 64 with the passage 66 and circumferential apertures 58, 60 with the passage 65, the areas of the circumferential apertures being chosen in the manner that has already been explained.

In order to prevent the control pintle 62 from rotating in operation, a universal or Cardan joint is provided between the control pintle 62 and the housing 50. The universal joint comprises a ring 69 and two pairs of diametrically opposite pins 67, 68. The pins 67 are secured to the control pintle 62 and extend into holes 67a in the ring 69, and the pins 68 are secured to a housing member 70 attached to the housing 50 and extend into the slide rails 68a which fit in dovetail grooves in the ring 69 as shown in FIG. 6. The universal joint permits limited movement of the control pintle 62 with respect to the housing 50 in the same manner that has been described with reference to FIGS. 1 and 2.

The screw connection 77 communicates with a chamber 75a in the housing member 70. One end of the chamber 75a is sealed by an annular collar 74 integral with the control pintle 62, a surface 73 of the collar being spherical and bearing against a complementary surface on a sealing ring 72, and a plane surface 71 on the sealing ring bearing against a plane surface on the housing member 70.

Sealing means for the other end of the chamber 75a comprises a sealing sleeve 79, a sealing ring 81, a lining ring 84 and a retaining clip 84a. The sealing sleeve 79 makes a close fit on the control pintle 62 and is slidable thereon, and a packing ring 78 is located in a groove in the sleeve 79 in order to ensure a good seal between the sleeve 79 and the control pintle 62. A surface 80 on the sleeve 79 is spherical and bears against a complementary surface on the ring 81, and at its opposite end, the ring 81 has a plane surface 82 which bears against a plane surface on the lining ring 84. The lining ring 84 makes a close fit in the bore of the housing member 70 and a packing ring 83 ensures a good seal therebetween. A spring 75 is disposed between the collar 74 and the sleeve 79, and urges the sleeve 79, the ring 81, and the lining ring 84 axially so that the lining ring 84 abuts the retaining clip 84a. Simultaneously, the spring 75 urges the control pintle 62 axially so that it bears against the sealing ring 72, the plane surface of the latter abutting the plane surface of the housing member 70.

The end of the housing member 70 is closed by a plate 93 and between the latter and a lining member 87, there is a spring 91. The lining member 87 makes a close fit in the housing member 70, and a packing ring 86 is provided to ensure a good seal therebetween. The end surface 88 of the control pintle 62 is spherical and bears against a complementary surface on a sealing ring 89. At its opposite end, the sealing ring 89 has a plane surface 90 which bears against a plane surface on the lining member 87. Thus in addition to the spring 75, the spring 91 exerts an axial force on the control pintle 62 through the lining member 87 and the sealing ring 89.

In operation, the passage 66 and the screw connection 77 are in communication by way of the chamber 75a, and the passage 65 and the screw connection 92 are in communication by way of the chamber 91a. Oil pressure in the chamber 75a acts on the collar 74 of the control pintle 62 in such a way that the axial force exerted by the springs 75, 91 on the control pintle 62 is supplemented to give rise to a resultant axial force in the direction of the arrow C. The oil pressure in the chamber 75a also acts on the sleeve 79 to supplement the axial force exerted on it by the spring 75. It is believed that the operation of the sealing means for chambers 75a, 91a and the operation of the universal joint between the control pintle 62 and the housing member 70 will be obvious from the description that has already been given. Should there be any leakage into the chamber 85a, the leakage oil can escape by way of the passage 85 into the housing 50. It should be noted that even if the bearings 51, 57 should wear by a limited amount, the effectiveness of the various sealing means for the chambers 75a, 91a will not be destroyed.

In FIG. 7, there is shown a longitudinal section of a machine that can be used as a motor or a pump. Two screw connections 122, 137 are provided on a housing member 108 which serve as the inlet and outlet connections respectively when the machine is used as a motor, and vice versa when the machine is used as a pump.

A rotor 100 is rotatably mounted in a housing 102 by means of bearings 103, 106, and is connected to a shaft 100a which extends out of the housing 102, a conventional shaft seal 101 being provided for the shaft 100a. In the rotor 100, there are a plurality of plungers 104, only one of which is shown in FIG. 7, which in operation reciprocate in the correct sequence within the rotor 100. The plungers 104 are rotatably supported in an anti-friction bearing 105.

A "floating" control pintle 148 has a spherical control surface 167 which bears against a complementary surface on the rotor 100. Two passages 150, 151 in the control pintle 148 lead to openings 155, 154 respectively in the control surface 148, and these openings 155, 154 communicate in sequence with passages 109, 110 in the rotor 100 as the latter rotates. Further openings 111, 112 in the control surface 167 which are always covered by the complementary spherical surface on the rotor 100 communicate with the passages in the control pintle 148 which lead to the control surface 167 thereof in order to ensure a "floating" condition of the control pintle 148 on the rotor 100.

A shaft 145 which is secured to the rotor 100 extends into a bore 177 in the control pintle 148 and terminates in a universal pivot bearing 186, 187 whose center is coincident with the centre of curvature of the control surface 167. The diameter of the bore 177 is greater than the diameter of the shaft 145. The pivot bearing 186, 187 allows the rotor 100 to rotate relative to the control pintle 148, and is capable of limited axial movement to compensate for any slight errors of production.

In order to prevent the control pintle 148 from rotating in operation, a universal or Cardan joint is provided between the control pintle and the housing member 103 which is fixed to the housing 102. The universal joint comprises a ring 115 and two pairs of diametrically opposite pins 114, 178. The pins 114 are secured to the control pintle 148 and extend into holes 166 in the ring 115, and the pins 178 are secured to the housing member 108 and extend into grooves 179 in slide rails 180 which fit in dovetail grooves in the ring 115 as shown in FIG. 8. The universal joint permits limited movement of the control pintle 148 with respect to the housing 102 and the housing member 108 in the same manner that has been described with reference to FIGS. 1 and 2.

The screw connection 122 communicate with a chamber 121 in the housing member 108. One end of the chamber 121 is sealed by sealing means comprising a sealing sleeve 119, a sealing ring 117, a lining member 152 and a retaining clip 188. The latter serves as a stop for the member 152, the ring 117, and the sleeve 119 which are urged axially along the control pintle 148 by a spring 120. The sleeve 119 makes a close fit on the control pintle 148 and is slidable thereon, and a packing ring 156 is located in a groove in the sleeve 119 to ensure a good seal between the sleeve and the control pintle. The sleeve 119 has a spherical surface 118 which bears against a complementary surface on the ring 117, the latter having a plane surface 116 which bears against a plane surface on the lining member 152. The lining member makes a close fit in the bore of the housing member 108 and a packing ring 149 ensures a good seal therebetween.

The other end of the chamber 121 is sealed by a similar sealing means comprising a sealing sleeve 123 having a spherical surface 124, and provided with a packing ring 166, a sealing ring 125 having a plane surface 126, a lining member 127 provided with a packing ring 128, and a retaining clip 129.

The screw connection 137 communicates with a chamber 136 in the housing member 108. Sealing means for sealing each end of the chamber 136 are similar to the sealing means for sealing the chamber 121. Thus, one end of the chamber 136 is sealed by a sleeve 140 having a spherical surface 131, and provided with a packing ring 139, a sealing ring 132 having a plane surface 133, a lining member 34 provided with a packing ring 135, and a retaining clip 129. The other end of the chamber 136 is sealed by a sleeve 142 having a spherical surface 143 and a packing ring 141, a sealing ring 144 having a plane surface 145', a lining member 146 provided with a packing ring 147, and a retaining clip 168. The two sleeves 140, 142 are urged apart by a spring 138.

The passages 150, 151 communicate by way of passages 157, 158 respectively with a chamber 165 in the housing member 108, one end of the chamber 165 being sealed by a cover plate 176 secured to the housing member 108. Within the passages 157, 158 there are valves 159, 160 respectively which are urged by springs 161, 162 respectively so as to tend to close the passages 157, 158. The springs 161, 162 are maintained in compression by a disc 163 past which fluid can flow into the chamber 165 if either the valve 159 or 160 is open.

The chamber 165 is sealed by means of a slidable sealing sleeve 174 having a spherical surface 173 and a packing ring 175, a sealing ring 172 having a plane surface 171, and a lining member 170 provided with a packing 169. The sleeve 174, the ring 172 and the lining member 170 are urged axially by a spring 164 so that the lining member bears against the retaining clip 168.

The chamber 165 communicates with the bore 177 in control pintle 148 by way of a passage 183.

In operation, if the pressure of fluid in either the chamber 121 or the chamber 136 is sufficient to open the valve 159 or the valve 160 respectively, then that fluid will flow into the chamber 165. The pressure of fluid in the chamber 165 acts on the end of the control pintle 148, thus urging the control surface 167 thereof against the complementary surface of the rotor 100.

The area of the end of the control pintle which extends into the chamber 165 is chosen so that the bearing pressure between the control pintle 148 and the rotor 100 will be sufficient to maintain a good seal therebetween, and yet not too great to cause large friction losses. It is believed that it will be obvious how the various sealing means operate to maintain a good seal for the chambers 121, 136 and 165 from the description that has already been given. Any fluid which leaks into the chamber 139 and 182 can flow into the interior of the housing 102 through a passage 107.

In FIG. 10, there is shown a longitudinal section of a further machine that can serve as a vane motor or a vane pump. The means for sealing the chamber 1121, 1136 through which communication is established between screw connections 1122, 1137 and passages 1150, 1151 respectively in a control pintle 1148, and the means for preventing rotation of the control pintle 1148, are similar to those shown in FIG. 7 and will not be described in detail.

The following list gives the reference numerals of those parts shown in FIG. 10 which correspond to function with equivalent parts in FIG. 7.

| FIG. 10: | FIG. 7 |
| --- | --- |
| 1146 | 146 |
| 1147 | 147 |
| 1144 | 144 |
| 1142 | 142 |
| 1137 | 137 |
| 1138 | 138 |
| 1140 | 140 |
| 1132 | 132 |
| 1134 | 134 |
| 1135 | 135 |
| 1129, 1129a | 129 |
| 1127 | 127 |
| 1128 | 128 |
| 1125 | 125 |
| 1123 | 123 |
| 1122 | 122 |
| 1119 | 119 |
| 1117 | 117 |
| 1152 | 152 |
| 1149 | 149 |
| 1188 | 188 |
| 1114 | 114 |
| 1115 | 115 |
| 1178 | 178 |

A rotor for the machine comprises an annular ring 1824 mounted on a cylindrical bush 1804, there being a plurality of ports 1821 which extend through both the ring 1824 and the bush 1804 as shown in FIG. 11. Two plates 1827 abut the opposite faces of the ring 1824 and the plates are enclosed in two casing members 1828. The ring 1824, plates 1827, casing member 1828, and a shaft 2125 are all bolted together by means of bolts 1823 so as to form with the bush 1804, an integral rotor unit. The rotor is supported in bearings 2117 in a housing 2101, and a conventional shaft seal 1820 is provided for the shaft 2125.

The ring 1824, the two plates 1827, and the two casing members 1828 define an annular circumferential groove in the rotor unit, in which groove a ring 2034 is located which forms the inner ring of an anti-friction bearing having an outer ring 2137 and roller bearings 2035. The outer ring 2137 is slidable in grooves 1822 (FIG. 11) in the housing 2101 on adjustment of the position of an arm 2038 secured to the ring 2137 from the exterior of the housing thereby to vary the eccentricity of the ring 2034 with respect to the axis of the rotor unit.

The space between the ring 2034 and the annular ring 1824 is divided into three working chambers each denoted by the reference numeral 2036 by means of three vanes 2233. The vanes 2233 are located in slots 2103 which in their longitudinal direction are parallel to the rotor axis, and are formed in the annnual ring 1824 and the two plates 1827. The width of each slot 2103 in the plates 1827 and the annular ring 1824 is of the same width as the vanes as shown in FIG. 11, and the slots extend outwardly in the plates 1827 as far as the internal surfaces of the casing members 1828. Thus the walls of each working chamber 2036 are formed by portions of the annual ring 1824, the ring 2034, the parts of the plates 1827 which extend beyond the annular ring 1824, and the side walls of the two vanes 2233 which face the interior of the working chamber. It will be seen that though the slots 2103 are longer than the vane 2233, there is no communication between the slots 2103 and the working chambers 2036 since the vane 2233 cooperating with the plate 1827 seal the working chambers.

In each vane 2233, there is provided a flexible packing 2262 which is located in a groove 2155. The walls of the groove are cut away in the center as will be apparent from FIG. 10 so that the packing 2262 can make good contact with the internal surface of the ring 2034.

In addition to the slots 2103, four annular passages 2157, 2157a, 2158, 2158a are provided in the rotor unit between the plates 1827 and the casing members 1828. Communication is established between these passages through the passages 2231, 2121 and 2122 in each slot 2103. Furthermore, the annular passage 2158 communicates with a passage 1926 which leads to a chamber 1116 in the rotor unit.

The control pintle 1148 makes a close fit within the cylindrical bush 1804 of the rotor unit. Apertures 1058, 1060 and 1061, 1064 formed in the circumference of the control pintle communicate with the passages 1151, 1150 respectively and serve to ensure a "floating" condition in operation of the control pintle with respect to the rotor unit. A passage 1927 connects an annular circumferential groove 1826 to the passage 1150 for lubrication purposes.

As shown in FIG. 10, each passage 1150, 1151 communicates with opposite ends of a cylinder 1807 through apertures 1801, 1802, respectively. A piston 1808 is movable in the cylinder 1807, and the latter communicates with the chamber 1116 through a passage 1809. The chamber 1116 is sealed by an arrangement similar to that for sealing the chamber 1136 or 1121. Thus two sealing sleeves 1817, 1812 are urged apart by a spring 1816, the sleeve 1817 thus urging a sealing ring 1818 against part of the rotor unit, and the sleeve 1812 urging a sealing ring 1814 against a lining ring 1813 which in turn is urged against a spring retaining clip 1810. A packing ring 1811 is embedded in the circumference of the lining ring 1813 to improve the seal between the latter and the rotor unit.

A passage 1819 is provided in the rotor unit whereby fluid which has leaked from the chamber 1116 is led to the shaft seal 1820.

In operation, of the two connections 1122, 1137, which is the high-pressure connection and which is the low-pressure connection will depend on which direction it is desired that the shaft 2125 should rotate if the machine is to be used as a motor, and on which direction the shaft 2125 is rotated if the machine is used as a pump.

Assuming for example that the machine is to be used as a motor, and it is desired that the shaft should rotate in a clockwise direction as seen in FIG. 11, then fluid under pressure is supplied to connection 1122, and the connection 1137 serves as the discharge connection.

The fluid from the connection 1122 passes into the chamber 1121, along the passage 1150, through the passage 1821 shown in FIG. 10 as communicating with the passage 1150, and into the working chamber 2036 which is uppermost as shown in FIG. 11. The pressure in this working chamber causes the rotor unit to turn so that the volume of the working chamber increases, i.e. the rotor unit turns in a clockwise direction as seen in FIG. 11, fluid simultaneously being discharged from the two lower working chambers through the passage 1151 and the connection 1137.

Since the fluid pressure in the passage 1150 is higher than in the passage 1151, the piston 1808 is forced downwardly in the cylinder 1807 into the position shown, where it seals the passage 1802. Thus the pressure of fluid in the passage 1150 is transmitted by way of passages 1801, 1809, 1815, chamber 1116, and passage 1926 into the slots 2103, and the annular passages 2157, 2158, 2157a and 2158a in the rotor unit. As can be seen from FIG. 11, the pressure in the passage 2231 forces the vane 2233 radially outwardly so that the flexible packing 2262 makes good contact with the internal surface of the ring 2034. The pressure in the passage 2121 and 2122 (FIG. 10) are equal, so the vane 2233 does not experience a resultant longitudinal force as a result. It will be appreciated that the radially outward force experienced by the vane 2233 due to the pressure in the passage 2231 is counterbalanced to some extent by the pressure which exists in the spaces between the ends of the vane and the radially outermost portions of the casing members 1828.

It is believed that the operation of the various sealing means for the control pintle 1148 and the means for preventing rotation thereof will be apparent from the description that has already been given. Any fluid that leaks from the chambers 1136, 1121 can escape to the interior of the housing 2101 by way of the passage 1085.

If it is desired to alter the performance characteristic of the machine, this can be done by varying the eccentricity of the ring 2034 with respect to the axis of the rotor unit by adjusting the position of the arm 2038 in a manner known per se.

It has been found that sealing arrangements of the kind that have been disclosed are suitable for use in machines in which for example oil reaches pressure as high as 300 atmospheres.

From the foregoing it will be obvious that the principles of the invention may be carried into effect by means of a wide variety of specific structural embodiments, that various features may be combined in different ways and that certain features may be employed to the exclusion of others. The invention is accordingly to understand as embracing all forms of apparatus falling within the scope of the appended claims.

Having thus described the invention, what is claimed as new and desired to be secured by Letters Patent, is:

1. A fluid pressure apparatus including a casing, a rotor rotatably mounted in said casing, a relatively elongated control pintle extending axially from said rotor and formed with a pair of passages therealong, the respective passages of the pair communicating with inlet and outlet ports in said rotor, chamber means in said casing for supplying fluid under pressure to one of said passages and means for receiving exhaust fluid from the other passage, a mounting secured to said casing and to said pintle externally of said rotor and substantially inhibiting rotation of said pintle; said mounting including cooperating components secured to said casing and said pintle and providing for limited angular movement of said pintle in planes including the axis of said rotor to follow eccentric motions of said rotor, and said mounting providing for limited longitudinal movement of said pintle; sealing means between the periphery of said pintle and said casing preventing leakage of fluid from said chamber around said pintle, said sealing means including an annular seal surrounding said pintle and having one annular end surface, said casing having a complementary annular surface engaging said one annular end surface to form a first pair of annular sealing surfaces, and said sealing means having a second annular end surface, said pintle having means forming a complementary annular surface engaging said second annular end surface to form a second pair of annular sealing surfaces; at least one pair of said annular sealing surfaces being spherical to accommodate said angular movement of said pintle; and means biasing said annular seal in a direction to maintain said pairs of annular sealing surfaces in fluid-tight engagement.

2. The improvement claimed in claim 1 in which the sealing surfaces of the other pair are radial and plane.

3. The improvement claimed in claim 1 in which the fluid pressure in said chamber means and said passages urges said pintle to move axially in a direction to maintain said annular sealing surfaces in fluid-tight engagement.

4. The improvement claimed in claim 1 in which said biasing means comprises spring means operating to move said annular seal axially of itself.

5. The improvement claimed in claim 3 in which said biasing means further comprises spring means operating to move said annular seal axially of itself in a direction to augment the action of said fluid pressure in maintaining said pairs of annular sealing surfaces in fluid-tight engagement.

6. The improvement claimed in claim 4 in which there are an additional pair of annular seals spaced apart longitudinally of said pintle; said spring means comprising a compression spring embracing said pintle between said annular seals.

7. The improvement claimed in claim 1, including a member having a close fit with and rotatable relative to said pintle, said second annular surface of said pintle being formed on said member.

8. The improvement claimed in claim 1 in which the complementary surface on said pintle is formed by an integral portion of said pintle.

9. The improvement claimed in claim 1 in which said mounting comprises a Cardan ring type universal joint.

10. The improvement claimed in claim 9, in which the Cardan joint comprises an inner and an outer ring and the outer ring of the joint has a pair of diametrically opposite axially extending grooves, a pair of shoes each slidably engaged in a respective one of said grooves, and a pair of pins each carried by a respective shoe and engaged in said casing.

11. The improvement claimed in claim 1 in which said casing is provided with an inlet connection for fluid flowing to said pintle, said sealing means being disposed between said inlet connection and the passage of said pintle communicating with the inlet port in said rotor.

12. The improvement claimed in claim 1, including a plurality of vanes defining a plurality of circumferential working chambers in the rotor, said rotor having slots which extend parallel to the axis of the rotor and which accommodate said vanes, an anti-friction bearing having an inner ring, the radially outermost surfaces of the vanes bearing against the internal surface of the inner ring of said anti-friction bearing, said vanes and said slots being wider than said inner ring and being so disposed and arranged as to seal said working chambers, and means, including said passages, for applying fluid pressure to the radially innermost surfaces of the vanes in the slots, thereby to urge the vanes into sealing engagement with the inner ring.

13. The improvement claimed in claim 12, including a shaft mounting said rotor, said fluid pressure applying means extending from the pintle into said shaft and from said shaft into the slots of said rotor.

14. A sealing arrangement as claimed in claim 1 in which said pintle and said casing have cooperating additional surfaces, said sealing means including at least one resilient packing ring disposed between the cooperating surfaces of said pintle and said casing, respectively.

References Cited in the file of this patent

UNITED STATES PATENTS

| | | |
|---|---|---|
| 1,740,682 | Carrey | Dec. 24, 1929 |
| 1,917,783 | Vickers | July 11, 1933 |
| 1,934,717 | Johnson | Nov. 14, 1933 |
| 1,981,481 | Tursky | Nov. 20, 1934 |
| 2,649,741 | Henrichsen | Aug. 25, 1953 |

FOREIGN PATENTS

| | | |
|---|---|---|
| 214,742 | Great Britain | Apr. 30, 1924 |
| 580,593 | Great Britain | Sept. 12, 1946 |